(12) United States Patent
Quinton et al.

(10) Patent No.: US 12,040,519 B2
(45) Date of Patent: Jul. 16, 2024

(54) FUEL CELL COMPRISING AT LEAST ONE INTEGRATED TRACTION MEMBER

(71) Applicant: SAFRAN POWER UNITS, Toulouse (FR)

(72) Inventors: Romain Quinton, Moissy-Cramayel (FR); Jean-Baptiste Jollys, Moissy-Cramayel (FR); Théophile Horde, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 591 days.

(21) Appl. No.: 17/299,134

(22) PCT Filed: Dec. 4, 2019

(86) PCT No.: PCT/EP2019/083645
§ 371 (c)(1),
(2) Date: Jun. 2, 2021

(87) PCT Pub. No.: WO2020/115119
PCT Pub. Date: Jun. 11, 2020

(65) Prior Publication Data
US 2022/0077486 A1     Mar. 10, 2022

(30) Foreign Application Priority Data

Dec. 6, 2018 (FR) ...................................... 1872463

(51) Int. Cl.
*H01M 8/248* (2016.01)
*H01M 8/2483* (2016.01)

(52) U.S. Cl.
CPC ......... *H01M 8/248* (2013.01); *H01M 8/2483* (2016.02)

(58) Field of Classification Search
CPC ...... H01M 8/248; H01M 8/2483; Y02E 60/50
See application file for complete search history.

(56) References Cited

U.S. PATENT DOCUMENTS

| 5,484,666 A | * | 1/1996 | Gibb | ................... H01M 8/2484 429/513 |
| 6,270,917 B1 | * | 8/2001 | Maeda | ................... H01M 8/247 429/514 |
| 2002/0127453 A1 | * | 9/2002 | Kitagawa | .............. H01M 8/241 429/457 |

(Continued)

FOREIGN PATENT DOCUMENTS

| DE | 69503648 T2 | 1/1999 |
| DE | 19948086 A1 | 9/2000 |

OTHER PUBLICATIONS

Search Report from the French Intellectual Property Office on corresponding FR application (FR1872463) dated Sep. 17, 2019.

(Continued)

*Primary Examiner* — Michael L Dignan
(74) *Attorney, Agent, or Firm* — Alumen IP Law PC (57) ABSTRACT

A fuel cell comprising a stack which comprises a plurality of cells, each cell comprising a plurality of fluid flow openings aligned in parallel to form a plurality of fluid flow lines in the stack, two end plates placed at the ends of the stack and at least one traction member connecting the end plates to each other in order to compress the stack, the traction member being mounted in a fluid flow line of the stack.

18 Claims, 6 Drawing Sheets

(56) References Cited

U.S. PATENT DOCUMENTS

2004/0062967 A1* 4/2004 Chaix ................... H01M 8/241
                                                            429/457
2005/0095484 A1* 5/2005 Saulsbury ............. H01M 8/248
                                                            29/730

OTHER PUBLICATIONS

International Search Report and Written Opinion on corresponding PCT application (PCT/EP2019/083645) from International Searching Authority (EPO) dated Feb. 24, 2020.

* cited by examiner

FUEL CELL COMPRISING AT LEAST ONE INTEGRATED TRACTION MEMBER

TECHNICAL FIELD

The present invention relates to the field of fuel cells, in particular, in the aeronautical field.

BACKGROUND

A fuel cell is used to produce electric energy from an electrochemical reaction between different fluids. Conventionally, a fuel cell is supplied with dihydrogen and dioxygen which react in the fuel cell to generate electric energy.

Figure 1:
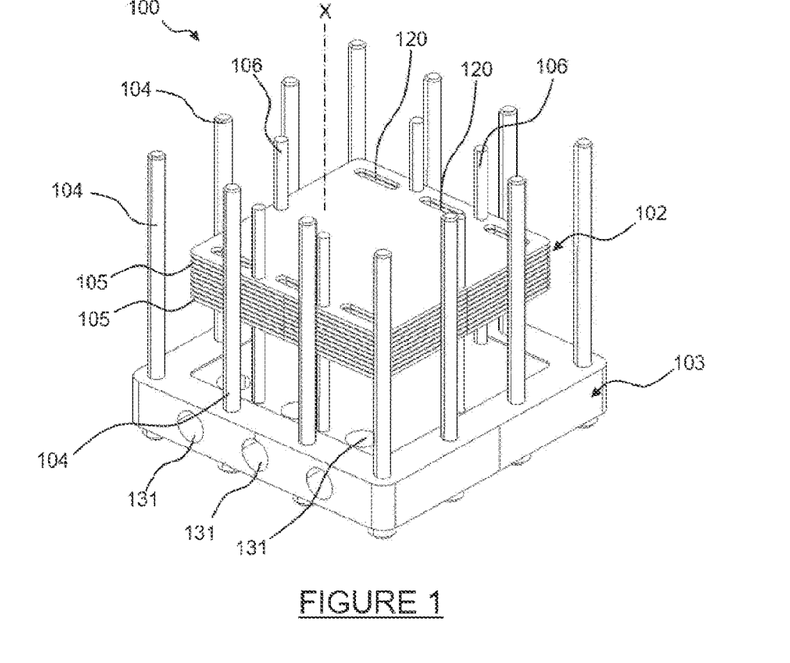
FIG. 1 is a schematic view of a fuel cell according to prior art described above.
Figure 2:
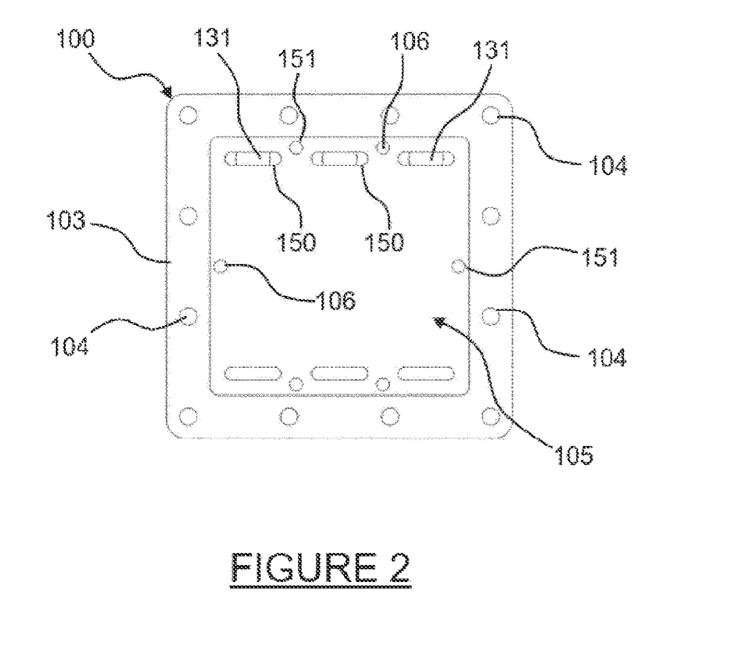
FIG. 2 is a schematic top view of the fuel cell of FIG. 1.

As illustrated in FIG. 1, a fuel cell 100 comprises a stack 102 comprising a plurality of cells 105 aligned along a stack axis X. Each cell 105 comprises a plurality of fluid circulation openings 150. The fluid circulation openings 150 are aligned in parallel to the stack axis X in order to form a plurality of fluid circulation pipings 120 in the stack 102. The stack 102 of cells 105, enables the electrochemical reaction from the fluids. As illustrated in FIG. 2, each cell 105 is in the form of a plate comprising, on the one hand, fluid circulation openings 150 and, on the other hand, guide openings 151. The fuel cell 100 comprises rectilinear guide members 106, which are circular in cross-section and extend into the guide openings 151 which are circular in cross-section. Thus, the circulation openings 150, oblong in shape in FIG. 1, are aligned to form fluid circulation pipings 120 in the stack 102. In a known manner, the fuel cell 100 has seals mounted between two adjacent cells 105 and comprising cutouts at the circulation openings 150 to form sealed fluid circulation pipings 120 to isolate fluids from each other, while allowing fluids to be channeled to each of the faces of the cells 105.

In a known manner, a fuel cell 100 further comprises two end plates 103 placed at the ends of the stack 102 along the stack axis X and a plurality of traction members 104, known to the person skilled in the art as "tie rods", connecting the end plates 103 together in order to compress the stack 102. In other words, the 35 cells 105 are sandwiched between the end plates 103. In a known manner, the end plates 103 also comprise ducts 131 fluidly connected to the fluid circulation pipings 120 to supply the stack 102 with fluids and to discharge said fluids.

In a known manner, the traction members 104 are in the form of threaded rods, the ends of which receive clamping nuts. As illustrated in FIG. 1, the traction members 104 extend at the periphery of the end plates 103 so as to apply a homogeneous compression load to the stack 102 positioned in the center of the end plates 103. As a result of this stress, the end plates 103 have larger dimensions than the cells 105 as illustrated in FIG. 2. Unlike the guide members 106, tensile forces are transmitted through the traction members 104. For this reason, the traction members 104 have a larger diameter than the guide members 106 as illustrated in FIG. 1.

Such a fuel cell 100 has drawbacks. Indeed, numerous guide members 106 and numerous traction members 104 are required to provide precise mounting and optimal sealing of the cells 105 in the stack 102, which makes such mounting complex and increases weight and overall size of the fuel cell 100. In addition, the presence of numerous guide members 106 and numerous traction members 104 requires the provision of numerous openings 150, 151 in the cells 105, which increases their manufacturing cost.

Thus, there is a need for a fuel cell that solves at least some of these drawbacks.

From documents US 200406267 A1, DE 19948086 A1, DE 69503648 T2 and US 2002127453, fuel cells are known comprising a stack of plates sandwiched between two end plates, held by means of tie rods. The tie rods are positioned so as to pass through each plate through ports that also allow fluid circulation in the stack.

SUMMARY

To this end, the invention relates to a fuel cell comprising a stack comprising a plurality of cells aligned along a stack axis X, each cell comprising a plurality of fluid circulation openings, said fluid circulation openings being aligned in parallel to the stack axis X so as to form a plurality of fluid circulation pipings in the stack, two end plates placed at the ends of the stack along the stack axis X and at least one traction member connecting the end plates to each other so as to compress the stack.

The invention is remarkable in that the traction member is mounted in a fluid circulation piping of the stack.

By virtue of the invention, the overall size of a fuel cell is reduced given that the traction member is integrated into the volume of the stack, unlike prior art which required the traction members to be placed around the stack. Since the traction members are closer to the stack, compression of the stack is more uniform. Advantageously, this reduces the dimensions of the end plates. Since the end plates are solid, the weight of the fuel cell can be significantly reduced. Advantageously, a traction member performs a guiding function, on the one hand, and a traction function on the other hand. By virtue of the invention, the guide members according to prior art are advantageously dispensed with. Advantageously, the number of traction members is also reduced, which limits weight of the fuel cell. Advantageously, at an equivalent power, the overall size and weight of the fuel cell are reduced.

An immediate solution could have been to replace the existing guide members with traction members, but this would have led to larger guide openings, which would have negatively impacted the formation of the fluid circulation openings in each cell. By virtue of the invention, the guide members are not only replaced but also transferred in the circulation openings, which demonstrates an inventive step.

Preferably, the fuel cell comprises a plurality of traction members connecting the end plates to each other in order to compress the stack, and the traction members are respectively mounted in fluid circulation pipings of the stack. Thus, several traction members are used to enable homogeneous compression while limiting overall size of the fuel cell.

Preferably, the fuel cell comprises at least one inner traction member mounted in a fluid circulation piping of the stack and at least one outer traction member mounted externally to the stack in order to provide optimal compression regardless of the position of the circulation pipings.

Preferably, the fluid circulation piping, into which the traction member extends, has a cross-sectional area greater than the cross-sectional area of said traction member in order to allow the circulation of a fluid in the fluid circulation piping externally to said traction member.

According to one aspect of the invention, each fluid circulation opening of the fluid circulation piping, into which the traction member extends, has two narrow side portions and a widened central portion. Advantageously, the widened central portion allows a traction member to be accommodated, while the side portions allow a large fluid circulation cross-section to be provided.

Preferably, each cell has only fluid circulation openings. In other words, each cell does not comprise a guide opening, which limits the number of openings that have to be made in a cell. The cost and time to manufacture a cell are reduced.

Preferably, a traction member extends through each of the fluid circulation openings in each of the cells. Compression and guiding of the cells are homogeneously achieved in the stack.

According to a preferred aspect of the invention, the traction member is mounted in a sheath. Such a sheath makes it possible to protect the body of the traction member against the fluid circulating in the fluid circulation piping in which the traction member is mounted. Likewise, the sheath allows a cell to be guided by cooperation with a fluid circulation opening of the cell. Furthermore, the cross-sectional area of the traction member can be defined to perform a foolproofing function accelerating the cell stacking steps.

Preferably, the sheath is configured to cooperate in a form-fitting manner with a fluid circulation opening of the fluid circulation piping in which the traction member is mounted. Thus, the circulation openings also allow the cells to be guided as they are stacked, thereby limiting the number of openings in each cell. The traction member thus fulfills a guiding function.

Preferably, the sheath is made of a material that is neutral with respect to the fluid circulating in the fluid circulation piping in which the traction member is mounted. This is particularly advantageous when the fluid is dihydrogen or a coolant. Such a feature avoids any reaction between the fluid and the sheath but also between the fluid and the traction member mounted in the sheath.

Preferably, the sheath comprises at least one fluid circulation groove. Thus, the sheath provides a guiding and/or protective function while allowing a sufficient amount of fluid to circulate.

The invention further relates to a method for assembling a fuel cell as set forth above, said method comprising:
- a step of mounting at least one traction member in a fluid circulation piping of the stack,
- a step of connecting the end plates by the traction member so as to compress the stack.

The invention also relates to a method for using a fuel cell as set forth above, said method comprising a step of circulating a fluid in the fluid circulation piping of the stack in which the traction member is mounted.

BRIEF DESCRIPTION OF THE DRAWINGS

The invention will be better understood upon reading the following description, given only by way of example, and referring to the appended drawings given as non-limiting examples, in which identical references are given to similar objects and in which.

It should be noted that the figures set out the invention in detail to implement the invention, said figures may of course be used to better define the invention if necessary.

DETAILED DESCRIPTION

Figure 3:
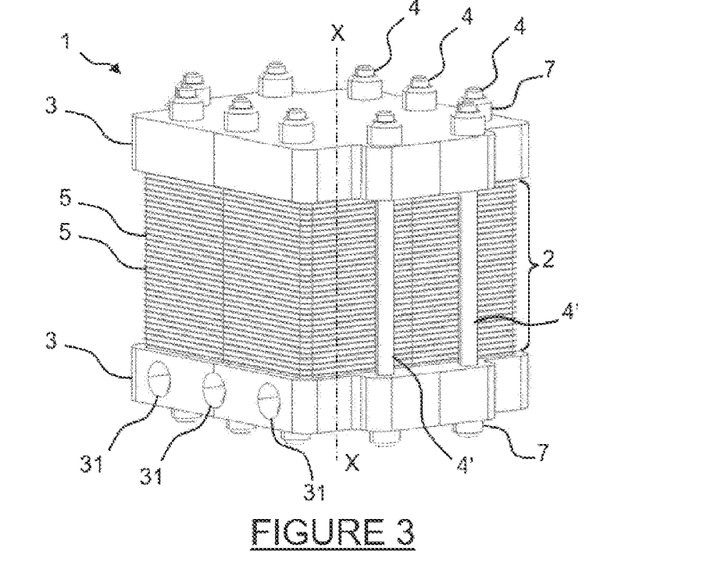
FIG. 3 is a schematic view of one embodiment of a fuel cell according to the invention.

With reference to FIG. 3, a fuel cell 1 according to one embodiment of the invention for generating electric energy from an electrochemical reaction is represented.

Conventionally, different fluids circulate through the fuel cell 1 in order to react together and thereby generate electric energy. Such a reaction can especially be an oxidation-reduction reaction between dioxygen and dihydrogen. The fuel cell 1 is thus supplied with dioxygen and dihydrogen. The oxidation-reduction reaction also generates water which is discharged from the fuel cell 1. In one preferred embodiment, the fuel cell 1 is a high-temperature fuel cell in which water generated by the reaction is in the vapor state. Indeed, vapor-state water is easily discharged as will be described later. The fuel cell 1 is also supplied with coolant in order to discharge heat generated by the electrochemical reaction. Such a coolant is a heat transfer fluid, such as oil or water, which can be mixed with additives.

Figure 4:
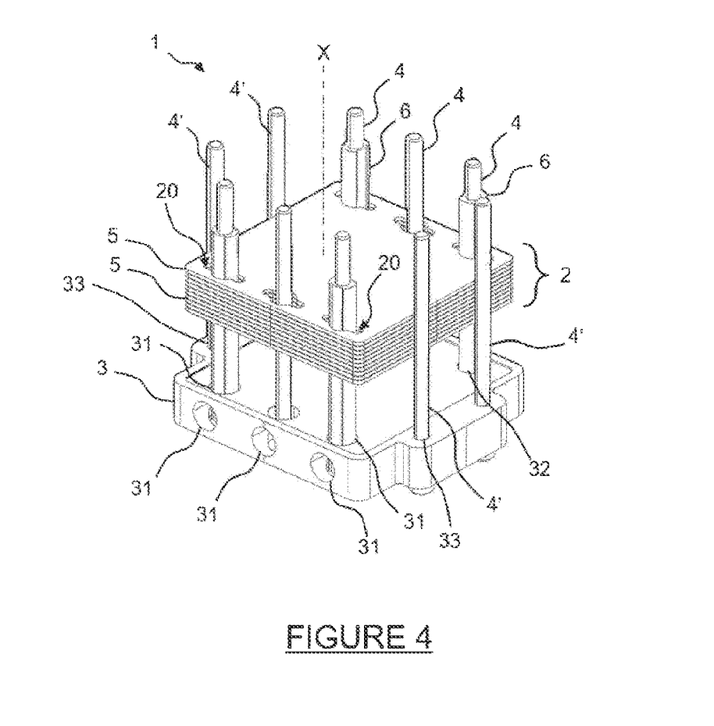
FIG. 4 is a schematic view of one embodiment of a fuel cell according to the invention in exploded view.

As illustrated in FIGS. 3 and 4, the fuel cell 1 comprises a stack 2 comprising a plurality of cells 5 aligned along a stack axis X. Each cell 5 comprises a plurality of fluid circulation openings 50, said fluid circulation openings 50 being aligned in parallel to the stack axis X to form a plurality of fluid circulation pipings 20 in the stack 2. The fuel cell 1 further comprises two end plates 3 placed at the ends of the stack 2 along the stack axis X. The fuel cell 1 further comprises a plurality of traction members 4, 4' connecting the end plates 3 to each other in order to compress the stack 2.

According to the invention, inner traction members 4 are mounted in the fluid circulation pipings 20 of the stack 2 in order to be integrated into the stack 2 as will be set forth subsequently.

Figure 5:
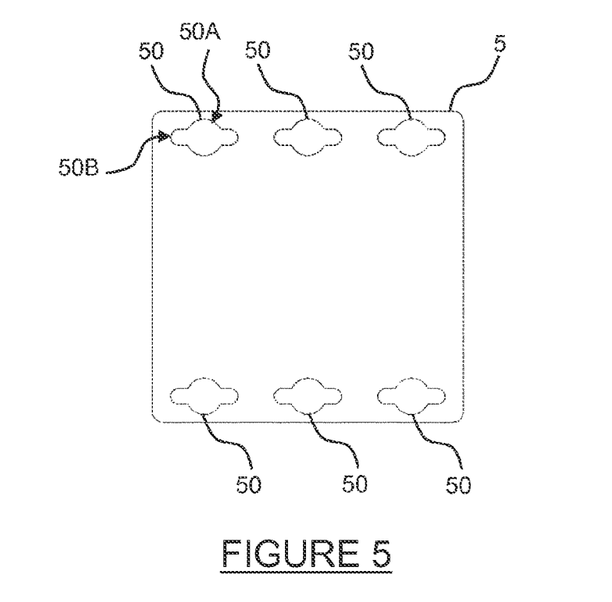
FIG. 5 is a schematic top view of a cell of the fuel cell of FIG. 4.

As previously indicated, the stack 2 comprises a plurality of cells aligned along a stack axis X. With reference to FIG. 5, each cell 5 comprises a plurality of fluid circulation openings 50, said fluid circulation openings 50 being aligned in parallel to the stack axis X to form a plurality of fluid circulation pipings in the stack 2 as represented in FIG. 4. The inner traction members 4 have a function of aligning and positioning the cells 5 of the stack 2.

Each cell comprises two electrodes at which the electrochemical reaction generating electric energy takes place. To carry out such a reaction, a cell 5 is supplied with various fluids, especially dioxygen and dihydrogen. Such a cell 5 is also referred to as an electrochemical cell. In this embodiment, each cell 5 has six fluid circulation openings 50 to form six fluid circulation pipings 20 in the stack 2. Of course, the number of fluid circulation pipings 20 could be different.

In this example, the stack 2 comprises three supply channels and three discharge channels for separately circulating three fluids through the cells: dihydrogen, dioxygen and a coolant. Vapor-state water generated by the oxidation-reduction reaction advantageously does not need a channel to be discharged, which limits complexity of the stack and makes such discharge easy.

In this example, with reference to FIG. 5, each cell 5 is in the form of a square-shaped plate defining four edges. Three fluid circulation openings 50 are placed along a first edge while three fluid circulation openings 50 are placed along a second edge, opposite to said first edge.

Figure 6:
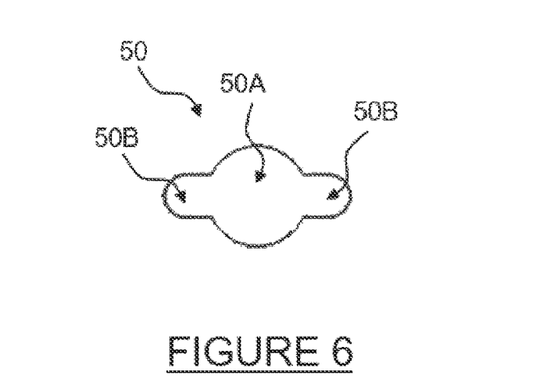
FIG. 6 is a schematic top view of a fluid circulation opening of a cell according to the invention.

With reference to FIGS. 5 and 6, each circulation opening 50 has an elongate shape. Preferably, each circulation opening 50 has a widened central portion 50A so as to allow for the insertion of an inner traction member 4 as will be set forth later. In this example, each circulation opening 50 has two narrow side portions 50B and a widened central portion 50A so as to allow fluid circulation through the side portions 50B. Preferably, the widened central portion 50A has a circular shape adapted to cooperate with a sheath 6 as will be set forth later. Preferably, the shape of each circulation opening 50 is the union of an oblong shape and a circular shape that are concentric.

The stack 2 preferably comprises seals placed between the fluid circulation openings 50 of the cells 5 in order to provide sealing of the circulation pipings in the stack 2 when the cells 5 are compressed.

As previously indicated, with reference to FIGS. 3 and 4, the fuel cell 1 comprises a plurality of traction members 4, 4' connecting the end plates 3 together in order to compress the stack 2.

Hereinafter, a distinction is made between, on the one hand, inner traction members 4 that extend into the fluid circulation pipings 20 of the stack 2 and, on the other hand, outer traction members 4' that extend externally to the fluid circulation pipings 20 of the stack 2.

In this exemplary embodiment, the inner traction members 4 and the outer traction members 4' have an identical structure, but it goes without saying that they could be different. Each traction member 4, 4' extends longitudinally in order to connect the two end plates 3 together. In this example, each traction member 4, 4' is in the form of a rectilinear rod, circular in cross section, extending parallel to the stack axis X. Each traction member 4, 4' has ends that are threaded to receive clamping nuts 7, as illustrated in FIG. 3, in order to achieve compression. After assembly, the ends of the traction members 4, 4' projectingly extend from the end plates 3 so that the clamping nuts 7 can be screwed on. It goes without saying that a traction member 4, 4' could have a different shape in order to achieve traction. Preferably, the traction members 4, 4' are made of metal material in order to transmit high compression loads.

According to one embodiment not represented, a circulation piping 20 comprises several inner traction members 4. Advantageously, the number and dimensions of the circulation openings 50 can be adapted.

With reference to FIG. 3, the fuel cell 1 comprises two end plates 3 that are mounted at each end of the stack 2 in order to compress the cells 5. In other words, the end plates 3 are mounted on either side of the stack 2 in order to sandwich the latter and thus compress the cells 5 along the stack axis X.

Figure 11:
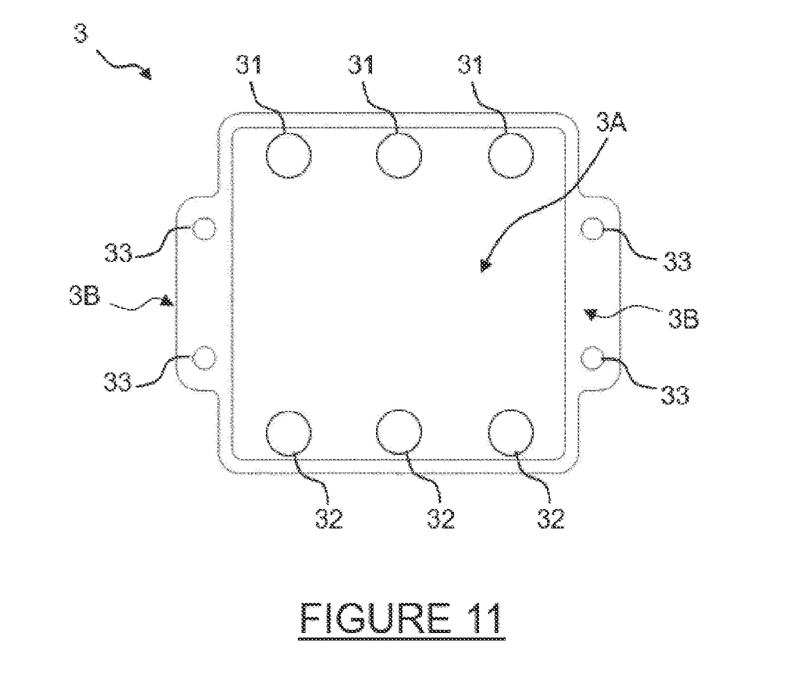
FIG. 11 is a schematic top view of an end plate of the fuel cell in FIG. 4.

As illustrated in FIG. 11, each end plate 3 comprises a central part 3A for cooperating with one end of the stack 2 and the inner traction members 4. Each end plate 3 further comprises two side parts 3B configured to allow mounting of outer traction members 4'.

Advantageously, the end plate 3 has an overall size that is reduced compared to an end plate according to prior art. The central part 3A has dimensions close to those of a cell 5, which differs from prior art. The central part 3A of the end plate 3 has supply openings 31 and discharge openings 32 fluidly connected to the circulation piping 20 of the stack 2 in order to supply them with fluids and discharge said fluids. In this example, with reference to FIG. 11, the end plate 3 has in its central portion 3A an alignment of three supply openings 31 and an alignment of three discharge openings 32. The supply openings 31 and the discharge openings 32 of each end plate 3 are connected to a fluid supply and discharge system of the fuel cell 1. In other words, fluids are supplied to the fuel cell 1 by entering through the supply openings 31 and then passing through the circulation pipings 20 of the stack 2. Finally, after reaction, the fluids are discharged from the fuel cell 1 through the discharge openings 32.

As illustrated in FIG. 11, the end plate 3 has a block shape defining four edges, the supply openings 31 are placed along a first edge of the end plate 3 and the discharge openings 32 are placed along a second edge of the end plate 3, opposite to said first edge.

In order to ensure a homogeneous compression, each end plate 3 comprises two side portions 3B projectingly extending from each of the third and fourth edges of the block that the end plate 3 is shaped like. In this example, each side portion 3B of the end plate 3 has two passage openings 33 into which outer traction members 4' can extend. Of course, the number of passage openings 33 could be different.

The presence of inner traction members 4 in the supply openings 31 and the discharge openings 32 as well as the presence of outer traction members 4' in the passage openings 33 enable a peripheral traction to be performed on the stack 2. In this way, the end plates 3 allow a homogeneous compression to be applied in order to provide sealing of the circulation pipings 20 between the cells 5.

Figure 12:
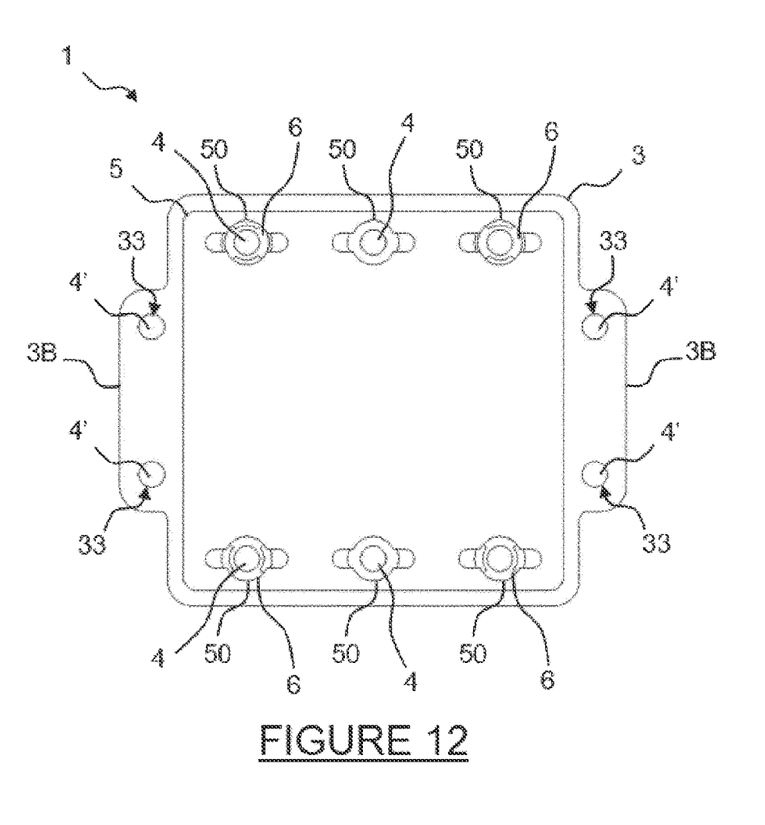
FIG. 12 is a schematic top view of the fuel cell of FIG. 4.

As illustrated in FIG. 4, four outer traction members 4' are mounted between the end plates 3. Each of the ends of the outer traction members 4' extends into a passage opening 33 as illustrated in FIG. 12. The mounting of an outer traction member 4' is analogous to prior art and will not be set forth in further detail.

In this example, an inner traction member 4 is mounted in each circulation piping 20 of the stack 2. To mount an inner traction member 4 in a circulation piping 20, the latter is inserted into circulation openings 50 of the cells 5 and openings 31, 32 of the end plates 3. The ends of each traction member 4, 4' projectingly extend from the end plates 3 in order to allow mounting of clamping nuts 7 for compressing the stack 2. In addition, a seal is placed between the inner traction member 4 and the opening 31, 32 of the end plate 3 in which the traction member 4 is mounted in order to provide sealing of each circulation piping 20 at the end plates 3.

As illustrated in FIG. 12, each inner traction member 4 extends into the widened portion 50A of the fluid circulation opening 50 of a cell 5. Thus, fluid is free to circulate through the side portions 50B of the fluid circulation opening 50 of a cell 5 but also externally to the inner traction member 4 in the widened portion 50A. Thus, despite the presence of an inner traction member 4, each cell 5 can be supplied with sufficient fluid flow rate.

As illustrated in FIG. 4, some of the inner traction members 4 mounted in the circulation openings 50 of the cells 5 are respectively mounted in sheaths 6 in order to electrically insulate them.

A sheath 6 extends longitudinally and has a central opening in which a traction member 4 is mounted. Thus, the sheath 6 prevents the inner traction member 4 from coming into contact with the fluid circulating in the circulation piping 20. Preferably, the sheath 6 is made of a material that is neutral with respect to fluids circulating in the circulation pipings 20, especially dihydrogen. Thus, the sheath 6 forms a protection around the traction member 4 in order to avoid any reaction between the traction member 4 and the fluid but also between the sheath 6 and the fluid. In particular, the sheath 6 provides electrical insulation to avoid any short-circuit between the bipolar plates.

Figure 7:
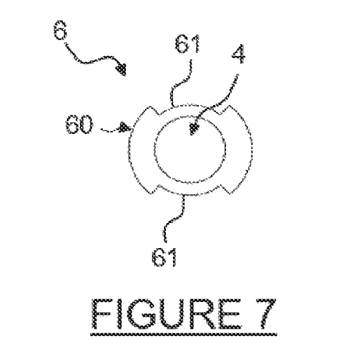
FIG. 7 is a transverse cross-section view of a traction member equipped with a sheath.

With reference to FIG. 7, the sheath 6 has a guide surface 60 the shape of which is complementary with a portion of a fluid circulation opening 50 of a cell 5. In this example, the guide surface 60 is substantially circular to cooperate with the widened central portion 50A which is circular. Advantageously, cooperation between the sheath 6 and the circulation openings 50 allows the cells 5 to be guided as they are stacked. Thus, the sheath 6 provides a first function of protecting the inner traction member 4 from the fluid and a second function of guiding the cells 5 as they are stacked.

It goes without saying that the guiding surface 60 could cooperate with the entire periphery of a fluid circulation opening 50.

In this example, sheaths 6 are provided in the dihydrogen, dioxygen and coolant circulation pipings 20. Preferably, the sheaths 6 are mounted in the circulation pipings 20 furthest from the center of the cells 5 in order to optimize guiding of the cells upon stacking them while limiting the number of sheaths 6 required for such guiding.

Preferably, each sheath 6 has longitudinal grooves 61 in order to allow for an increase in the cross-sectional area of fluid circulation in the circulation piping 20. In this example, each sheath 6 has two diametrically opposed longitudinal grooves 61.

Figure 8:
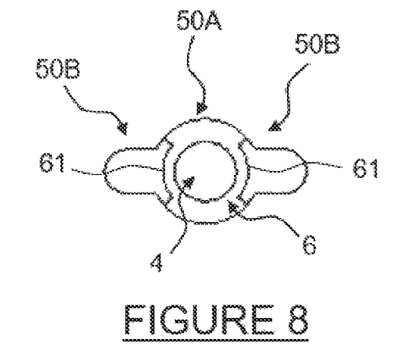
FIGS. 8 and 9 are schematic representations of the mounting of a traction member equipped with a sheath in a fluid circulation opening in two different orientations.
Figure 9:
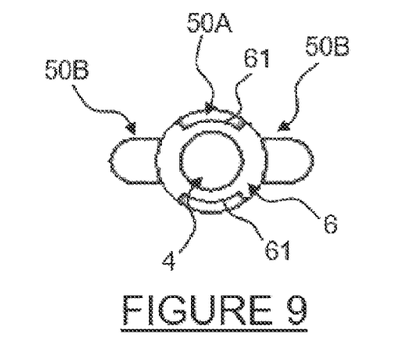
Figure 10:
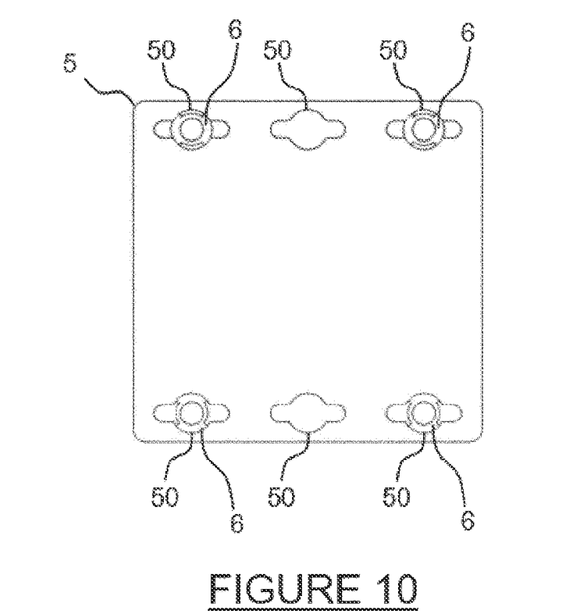
FIG. 10 is a schematic top view of a cell of the fuel cell of FIG. 4 in which traction members equipped with sheaths are mounted.

Advantageously, as illustrated in FIGS. 8 to 10, the sheath 6 can be oriented so as to form a foolproofing means when assembling the cells 5 to form a stack 2. This is particularly advantageous when the cells 5 are not symmetrical to each other. Likewise, the traction member 4 could itself perform the foolproofing function 20.

According to one aspect of the invention, a sheath 6 can be used temporarily upon forming the stack 2 to provide guiding of the cells 5 and removed prior to compressing the stack 2.

The method for assembling a fuel cell 1 according to the invention will now be described with reference to FIGS. 3 and 4.

First, inner traction members 4 are connected to an end plate 3, here a lower end plate 3, in a sealed manner so as to extend parallel to the stack axis X. Then, sheaths 6 are sleeved over the inner traction members 4. The cells 5 are then slid over the sheaths 6 to form the stack 2. In practice, the inner traction member 4 extends into the widened portion 50A of each fluid circulation opening 50 of each cell 5.

By virtue of the inner traction members 4 and in particular by virtue of the sheaths 6, the fluid circulation openings 50 of the cells 5 are aligned to form circulation pipings 20 in the stack 2. Preferably, seals are also placed between two adjacent cells 5 to provide sealing. In other words, the inner traction members 4 mounted in the sheaths 6 advantageously serve a guiding function.

Then, the upper end plate 3 is mounted at the upper end of the stack 2. Each end of the traction members 4 is then mounted in a supply opening 32 or a discharge opening 33 of an end plate 3 and passes through said end plate 3.

In this example, outer traction members 4' are also provided to directly connect the end plates 3 without extending into the stack 2. The traction members 4, 4' are distributed to allow a homogeneous compression of said cells 5.

Clamping nuts 7 are then mounted at the ends of the traction members 4, 4' to clamp the end plates 3 around the stack 2 so as to compress the cells 5. The seals between each cell 5 are then compressed, thereby sealing the circulation pipings 20.

Upon using the fuel cell 1, fluids are introduced through the supply openings 31 of the end plates 3 and then circulate through the circulation pipings 20 of the stack 2 before being discharged through the discharge openings 32 of the end plates 3.

In a given circulation piping 20, the fluid circulates through the circulation openings 50 of the cells 5, in particular through the side portions 50B and through the grooves 61 of the sheath 6.

The circulation cross-sectional area remains sufficient to achieve optimum efficiency. The presence of a sheath 6, preferably inert to the fluid, avoids any undesirable reaction with the sheath 6 but also with the traction member 4, which remains protected.

The fuel cell 1 according to the invention thus has a limited overall size by virtue of the mounting of the traction members 4 in the circulation pipings 20, that is, integrated into the volume of the stack.

The invention claimed is:

1. A fuel cell comprising:
    a stack comprising a plurality of cells aligned along a stack axis X, each cell comprising a plurality of fluid circulation openings, said plurality of fluid circulation openings being aligned in parallel to the stack axis X so as to form a plurality of fluid circulation pipings in the sack,
    an end plate at each of two ends of the stack aligned along the stack axis X,
    at least one traction member connected the two end plates to each other in order to compress the stack, the at least one traction member being mounted in a fluid circulation piping of the stack,
    wherein each of the plurality of fluid circulation openings, into which the at least one traction member extends, has two narrow side portions and a widened central portion, and
    wherein each of the two narrow side portions has two parallel side edges.

2. The fuel cell according to claim 1, wherein the at least one traction member comprises a plurality of traction members connecting the end plates to each other in order to compress the stack, each traction member of the plurality of traction members is mounted in a respective fluid circulation piping of the stack.

3. The fuel cell according to claim 1, wherein each of the plurality of fluid circulation pipings has a cross-sectional area that is larger than a cross-sectional area of said at least one traction member to allow a fluid to circulate in the fluid circulation piping having said at least one traction member to circulate externally to said at least one traction member.

4. The fuel cell according to claim 1, wherein each cell comprises only said plurality of fluid circulation openings.

5. The fuel cell according to claim 1, wherein the at least one traction member is mounted in a sheath.

6. The fuel cell according to claim 5, wherein the sheath is configured to cooperate in a form-fitting manner with the fluid circulation opening in which the at least one traction member is mounted.

7. The fuel cell according to claim 5, wherein the sheath is made of a material that is neutral with respect to a fluid circulating in the fluid circulation piping in which the at least one traction member is mounted.

8. The fuel cell according to claim 5, wherein the sheath comprises at least one fluid circulation groove.

9. A method for assembling the fuel cell according to claim 1, said method comprising:
- a step of mounting at least one traction member in a fluid circulation piping of the stack and
- a step of connecting the two end plates through the traction member so as to compress the stack.

10. A fuel cell comprising:
- a stack comprising two stack ends and a plurality of cells aligned along a stack axis X,
- each cell comprising a plurality of fluid circulation openings including a first fluid circulation opening and a second fluid circulation opening, said plurality of fluid circulation openings of each cell aligned with said plurality of fluid circulation openings of each adjacent cell to define a plurality of fluid circulation pipings including a first fluid circulation piping and a second fluid circulation piping,
- an end plate at each of the two stack ends of the stack, each end plate comprising a plurality of supply openings aligned with the plurality of fluid circulation pipings, the plurality of supply openings including a first supply opening and a second supply opening,
- at least two traction members including a first traction member and a second traction member, the at least two traction members connecting the two end plates to each other in order to compress the stack, the first traction member located in the first fluid circulation opening and the second traction member located in the second fluid circulation opening,
- wherein each of the first and second fluid circulation openings has two narrow side portions and a widened central portion located between the two narrow side portions, and
- wherein each of the two narrow side portions has two parallel side edges.

11. The fuel cell according to claim 10, wherein each of the first and second supply openings on each of the two end plates has an opening shape that differs from an opening shape of each of the first and second fluid circulation openings.

12. The fuel cell according to claim 10, wherein the first circulation piping has the first traction member located therein and the second circulation piping has the second traction member located therein.

13. The fuel cell according to claim 12, wherein the first fluid circulation piping has a cross-sectional area that is larger than a cross-sectional area of the first traction member.

14. The fuel cell according to claim 10, wherein each cell comprises only said plurality of spaced apart fluid circulation openings.

15. The fuel cell according to claim 10, wherein the first traction member is mounted in a first sheath.

16. The fuel cell according to claim 15, wherein the first sheath is configured to cooperate in a form-fitting manner with the first fluid circulation opening.

17. The fuel cell according to claim 15, wherein the first sheath is made of a material that is neutral with respect to a fluid circulating in the first fluid circulation piping.

18. The fuel cell according to claim 15, wherein the first sheath comprises at least one fluid circulation groove.

* * * * *